US011151250B1

(12) United States Patent
Chang et al.

(10) Patent No.: US 11,151,250 B1
(45) Date of Patent: Oct. 19, 2021

(54) EVALUATION OF FILES FOR CYBERSECURITY THREATS USING GLOBAL AND LOCAL FILE INFORMATION

(71) Applicant: Trend Micro Incorporated, Tokyo (JP)

(72) Inventors: Chia-Yen Chang, Taipei (TW); Wen-Kwang Tsao, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 81 days.

(21) Appl. No.: 16/448,300

(22) Filed: Jun. 21, 2019

(51) Int. Cl.
*G06F 21/56* (2013.01)
*G06F 16/22* (2019.01)
*G06F 21/53* (2013.01)

(52) U.S. Cl.
CPC ........ *G06F 21/565* (2013.01); *G06F 16/2255* (2019.01); *G06F 21/53* (2013.01); *G06F 2221/034* (2013.01)

(58) Field of Classification Search
CPC .... G06F 21/565; G06F 16/2255; G06F 21/53; G06F 2221/034
USPC .......................................................... 726/23
See application file for complete search history.

(56) References Cited

U.S. PATENT DOCUMENTS

| | | | |
|---|---|---|---|
| 7,865,947 B2 | 1/2011 | Fanton et al. | |
| 8,375,450 B1 | 2/2013 | Oliver et al. | |
| 8,413,244 B1 * | 4/2013 | Nachenberg | G06F 21/565 |
| | | | 726/23 |
| 8,516,587 B1 * | 8/2013 | Nachenberg | H04L 63/145 |
| | | | 726/23 |
| 8,769,683 B1 * | 7/2014 | Oliver | G06F 21/561 |
| | | | 726/23 |
| 8,925,087 B1 * | 12/2014 | Oliver | H04L 61/1511 |
| | | | 726/24 |
| 9,197,665 B1 | 11/2015 | Cabot et al. | |
| 9,361,458 B1 * | 6/2016 | Feng | G06F 21/564 |
| 9,690,937 B1 | 6/2017 | Duchin et al. | |
| 9,690,938 B1 | 6/2017 | Saxe et al. | |

(Continued)

FOREIGN PATENT DOCUMENTS

EP        1 678 635 B1    10/2013

OTHER PUBLICATIONS

MD5 Secured Cryptographic Hash Value Larry B. de Guzman, Ariel M. Sison, Ruji P. Medina MLMI2018: Proceedings of the 2018 International Conference on Machine Learning and Machine Intelligence . Sep. 2018, pp. 54-59 (Year: 2018).*

(Continued)

*Primary Examiner* — Samson B Lemma
*Assistant Examiner* — Mohammad S Shams
(74) *Attorney, Agent, or Firm* — Patrick D. Benedicto

(57) ABSTRACT

A global locality sensitive hash (LSH) database stores global locality sensitive hashes of files of different private computer networks. Each of the private computer networks has a corresponding local LSH database that stores local locality sensitive hashes of files of the private computer network. A target locality sensitive hash is generated for a target file of a private computer network. The global and local LSH databases are searched for a locality sensitive hash that is similar to the target locality sensitive hash. The target file is marked for further evaluation for malware or other cybersecurity threats when the target locality sensitive hash is not similar to any of the global and local locality sensitive hashes.

14 Claims, 7 Drawing Sheets

(56) References Cited

U.S. PATENT DOCUMENTS

| | | | | |
|---|---|---|---|---|
| 10,162,967 | B1* | 12/2018 | Oliver | H04L 9/3236 |
| 10,469,525 | B2* | 11/2019 | Hittel | H04L 63/145 |
| 10,621,346 | B1* | 4/2020 | Singh | H04L 9/3239 |
| 2009/0083852 | A1* | 3/2009 | Kuo | G06F 21/564 |
| | | | | 726/22 |
| 2013/0276120 | A1* | 10/2013 | Dalcher | H04L 63/1441 |
| | | | | 726/24 |
| 2015/0007319 | A1* | 1/2015 | Antonov | G06F 21/56 |
| | | | | 726/23 |
| 2016/0328579 | A1* | 11/2016 | Jois | G06F 21/85 |
| 2017/0060455 | A1* | 3/2017 | Deshmukh | G06F 3/0653 |
| 2017/0124325 | A1* | 5/2017 | Alme | G06F 21/564 |
| 2017/0193230 | A1* | 7/2017 | Jevnisek | G06F 21/564 |
| 2019/0026466 | A1* | 1/2019 | Krasser | G06F 21/565 |

OTHER PUBLICATIONS

Deep Learning for Unsupervised Insider Threat Detection in Structured Cybersecurity Data Streams Aaron Tuor, Samuel Kaplan, Brian Hutchinson, Nicole Nichols, Sean Robinson AAAI 2017Proceedings of AI for Cyber Security Workshop, Cryptography and Security (cs.CR); Machine Learning (cs.LG). pp. 1-9 (Year: 2017).*
Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-us-find-massive-certificate-abuse-by-browsefox/.
Wikipedia—Locality-sentive hashing, 8 pages [retrieved on May 20, 2019], retrieved from the internet: https://wikipedia.org/wiki/Locality-sensitive_hashing.
Joris Kinable, et al. "Malware Classification based on Call Graph Clustering", Aug. 27, 2010, pp. 1-12, Aalto University, Dept. of Information and Computer Science, Finland.
Swathi Pai, et al. "Clustering for malware classification", published online on Jan. 27, 2016, 13 pages, J Comput virol Hack Tech.
Peng Li, et al. "On Challenges in Evaluating Malware Clustering", 2010, 18 pages.
Kyle Soska, et al. "Automatic Application Identification from Billions of Files", Aug. 13, 2017, 10 pages.
Roberto Perdisci, et al. "VAMO: Towards a Fully Automated Malware Clustering Validity Analysis", Dec. 3-7, 2012, 10 pages.
PeHash: A Novel Approach to Fast Malware Clustering, Dec. 7, 2008, 8 pages.
Irfan Ui Haq, et al. "Malware Lineage in the Wild", Oct. 14, 2017, 15 pages.
Usha Narra "Clustering versus SVM for Malware Detection", May 2015, 71 pages, Master's Theses and Graduate Research, Dept. of Computer Science, San Jose State University, San Jose, California.
Mark Stamp "A Survey of Machine Learning Algorithms and Their Application in Information Security", Sep. 2018, 23 pages, San Jose State University, San Jose, California.
Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.
Joy Nathalie Avelino, et al. "Ahead of the Curve: A Deeper Understanding of Network Threats Through Machine Learning", 2018, 17 pages, Trend Micro, A TrendLabs Research Paper.
Animesh Nandi, et al. "Anomaly Detection Using Program Control Flow Graph Mining from Execution Logs", Aug. 2016, 10 pages, IBM Research, IIT Kanpur.
Managed Detection and Response—Definition, 7 pages [retrieved on Jun. 14, 2019], retrieved from the internet https://www.trendmicro.com/vinfo/us/security/definition/managed-detection-and-response.
Cluster analysis—Wikipedia, 19 pages [retrieved on Jun. 11, 2019], retrieved from the internet: https://en.wikipedia.org/wiki/Cluster_analysis.
K-nearest neighbors algorithm—Wikipedia, 10 pages [retrieved on Jun. 11, 2019], retrieved from the internet: https://en.wikipedia.org/wiki/K-nearest_neighbors_algorithm.
Autoencoder—Wikipedia, 6 pages [retrieved on Jun. 11, 2019], retrieved from the internet: https://en.wikipedia.org/wiki/Autoencoder.
DBSCAN—Wikipedia, 7 pages [retrieved on Jun. 11, 2019], retrieved from the internet: https://en.wikipedia.org/wiki/DBSCAN.
Jonathan Oliver, et al. "TLSH—A Locality Sensitive Hash", Nov. 21-22, 2013, 7 pages, The 4th Cybercrime and Trustworthy Computing Workshop, Sydney, AU.
Ban Xiaofang, et al. "Malware Variant Detection Using Similarity Search over Content Fingerprint", May 31-Jun. 2, 2014, 6 pages, IEEE The 26th Chinese Control and Decision Conference.

* cited by examiner

271: GROUP | NITEMS | MAX_DIST | CENTER | MAX_DIST_CENTER | LABEL | MW_NAME 272-1: TLSH | SHA1 | LABEL | CREATE TIME | CENSUS PREVALENCE | CENSUS MATURITY | SIGN/COMPANY | FILE PATH | FILE PATH TLSH | BEHAVIOR TAG 272-2: TLSH | SHA1 | LABEL | CREATE TIME | CENSUS PREVALENCE | CENSUS MATURITY | SIGN/COMPANY | FILE PATH | FILE PATH TLSH | BEHAVIOR TAG

•••

272-n: TLSH | SHA1 | LABEL | CREATE TIME | CENSUS PREVALENCE | CENSUS MATURITY | SIGN/COMPANY | FILE PATH | FILE PATH TLSH | BEHAVIOR TAG

EVALUATION OF FILES FOR CYBERSECURITY THREATS USING GLOBAL AND LOCAL FILE INFORMATION

BACKGROUND OF THE INVENTION

1. Field of the Invention

The present invention relates generally to cybersecurity, and more particularly but not exclusively to evaluation of files for cybersecurity threats.

2. Description of the Background Art

Computer files ("files") that have been detected as malware may be fingerprinted using a cryptographic hash function, such as the Secure Hash Algorithm 1 (SHA-1) function. To evaluate a file for malware, the SHA-1 hash of the file may be compared to the SHA-1 hashes of known malware files. The file may also be inspected for known-bad indicators of compromise (IOC) or indicators of attack (IOA). A problem with current file evaluation techniques is that there are multitudes of malware in the wild and malware may mutate to a number of variants, making malware detection complicated and malware IOC or IOA extremely difficult to keep up-to-date.

SUMMARY

In one embodiment, a global locality sensitive hash (LSH) database stores global locality sensitive hashes of files of different private computer networks. Each of the private computer networks has a corresponding local LSH database that stores local locality sensitive hashes of files of the private computer network. A target locality sensitive hash is generated for a target file of a private computer network. The global and local LSH databases are searched for a locality sensitive hash that is similar to the target locality sensitive hash. The target file is marked for further evaluation for malware or other cybersecurity threats when the target locality sensitive hash is not similar to any of the global and local locality sensitive hashes.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows a data structure of an example cluster in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
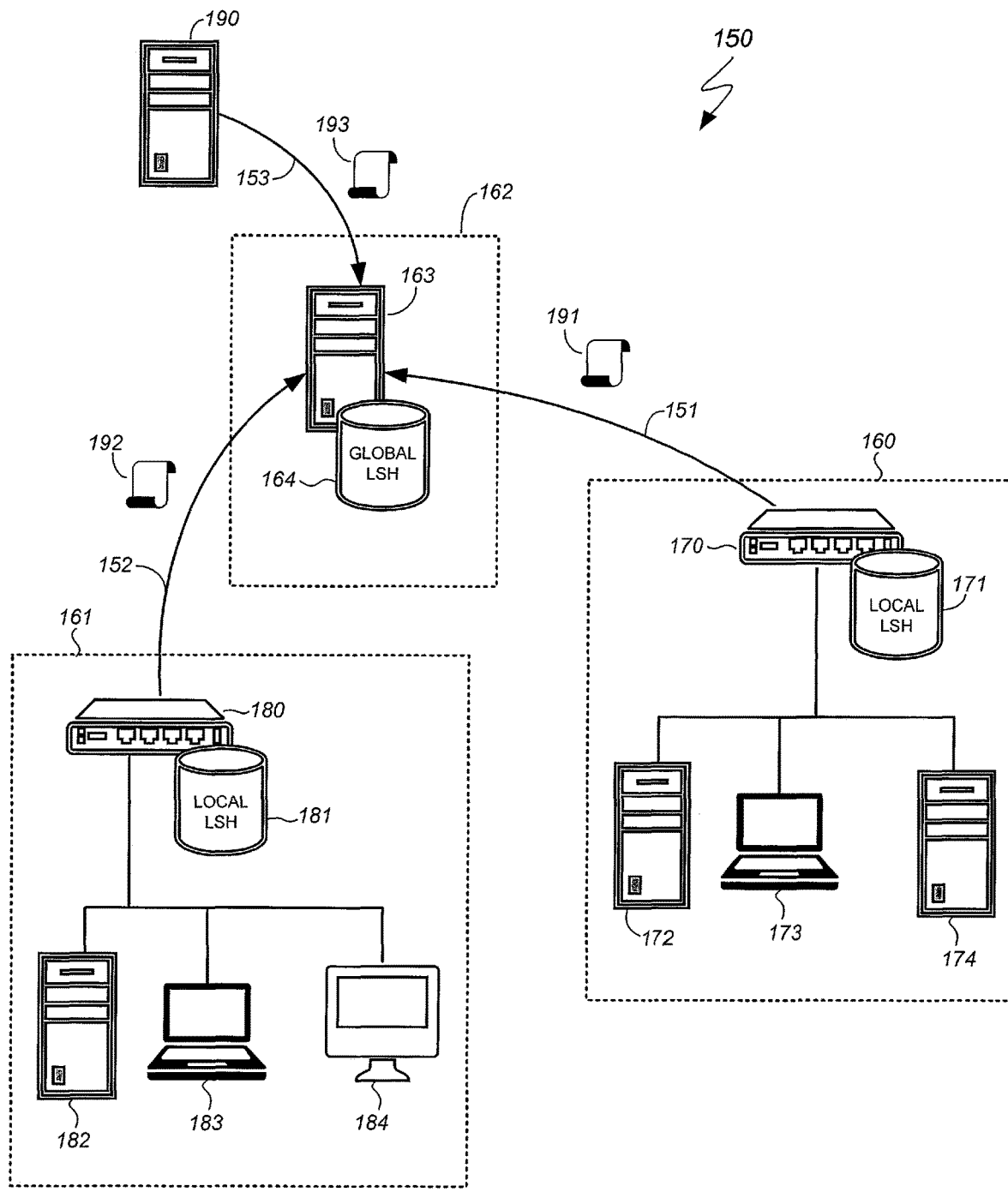
FIG. 1 shows a logical diagram of a system for evaluating files for malware or other cybersecurity threats in accordance with an embodiment of the present invention.

FIG. 1 shows a logical diagram of a system 150 for evaluating files for malware or other cybersecurity threats in accordance with an embodiment of the present invention. In the example of FIG. 1, the system 150 includes computers of a managed detection and response (MDR) service 162 and private computer networks 160 and 161. Generally speaking, the MDR service 162 may provide out-sourced cybersecurity service to a plurality of subscribing private computer networks, but only the private computer networks 160 and 161 are shown in FIG. 1 for clarity of illustration.

The MDR service 162 provides an "out-sourced" cybersecurity service in that it is not owned and operated by entities that own and operate the private computer networks 160 and 161. As a particular example, the MDR service 162 may be that provided by the assignee of the present application, Trend Micro™, Incorporated, whereas the private computer networks 160 and 161 may be owned and operated by customers of Trend Micro™, Incorporated. The out-sourced cybersecurity service is beneficial to private computer networks that do not have suitable infrastructure and/or experienced cybersecurity personnel.

In the example of FIG. 1, the private computer network 160 includes a plurality of network devices 172, 173, 174, etc., such as server computers, desktop computers, laptop computers, and/or other computing devices that may communicate over a computer network. The private computer network 160 may further include a network security device 170, for evaluating files for malware or other cybersecurity threats. The network security device 170 may be a server computer, gateway, firewall, appliance, or other suitable device for receiving and evaluating files. Files to be evaluated may be those attached to emails, stored in file servers, transmitted over computer networks, etc. The network security device 170 may consult a local LSH database 171 to obtain local file information. In one embodiment, the local LSH database 171 is stored in the infrastructure of the MDR service 162 and accessed in the private computer network by logical mapping. More particularly, the local LSH database 171 may be stored on a data storage device (i.e., physical drive) of a security operations center (SOC) server 163 of the MDR service 162, and accessed as a logical drive by the network security device 170.

The local LSH database 171 may store information of files that are local to the private computer network 160 (i.e., received and/or stored in the private computer network 160). File information stored in the local LSH database 171 may be referenced using the locality sensitive hash of the file. In one embodiment, local file information stored in the local LSH database 171 includes the locality sensitive hash of the file, exact cryptographic hash of the file (e.g., SHA-1), the label of the file (i.e., whether the file is known bad, known good, or unknown), the timestamp of the file (e.g., when the file was created or first detected, how many endpoints (i.e., computers) have the file, length of time since the creation/ detection of the file, the digital signature of the company that created the file, the file path of the file, the locality sensitive hash of the file path, and an indicator of a suspicious behavior of the file during execution (e.g., network connections, creates then deletes multiple files, deletes shadow copy, directory discovery, etc.). Depending on applicability or availability, some file information may be missing in the local LSH database 171. Local files that are known to be good may be so labeled by an administrator or by some other means. As can be appreciated, the local LSH database 171 may not necessarily have information on a non-local file, e.g., file received and/or stored in the private computer network 161.

The private computer network 161 may include a plurality of network devices (i.e., 182, 183, 184, etc.) and a network security device 180 with a corresponding local LSH database 181. These devices may operate similarly to their counterparts in the private computer network 160.

In the example of FIG. 1, the infrastructure of the MDR service 162 includes the SOC server 163. The SOC server 163 may comprise a computer system with associated software for receiving file information from subscribed computer networks and other sources, and for storing the file information in a global locality sensitive hash (LSH) database 164. File information stored in the global LSH database 164 is also referred to herein as "global file information."

The global LSH database 164 may be stored in a data storage device that is accessible to the SOC server 163. Global file information stored in the global LSH database 164 may be referenced using the locality sensitive hash of the corresponding file. In one embodiment, file information stored in the global LSH database 164 is the same as those stored in a local LSH database (i.e., locality sensitive hash of the file, exact cryptographic hash of the file, label of the file, the timestamp of the file, etc.), but the global LSH database 164 may have file information of local LSH databases of all subscribing private computer networks and may receive file information from other sources. A local LSH database may periodically synchronize its file contents with the global LSH database 164.

More particularly, unlike a local LSH database, the global LSH database 164 may include information of files received from a plurality of different private computer networks. For example, the SOC server 163 may receive, from the network security device 170, an LSH 191 and other information of a file of the private computer network 160 (see arrow 151). Similarly, the SOC server 163 may receive, from the network security device 180, an LSH 192 and other information of a file of the private computer network 161 (see arrow 152). As another example, the SOC server 163 may receive, from an external feed (e.g., from a server 190), an LSH 193 and other information of a file of some other computer (see arrow 153). For privacy reasons, because file information from different computer networks may be stored in the global LSH database 164, the SOC server 163 does not necessarily need to receive the file itself; the locality sensitive hash and other information of the file will suffice.

Figure 2:
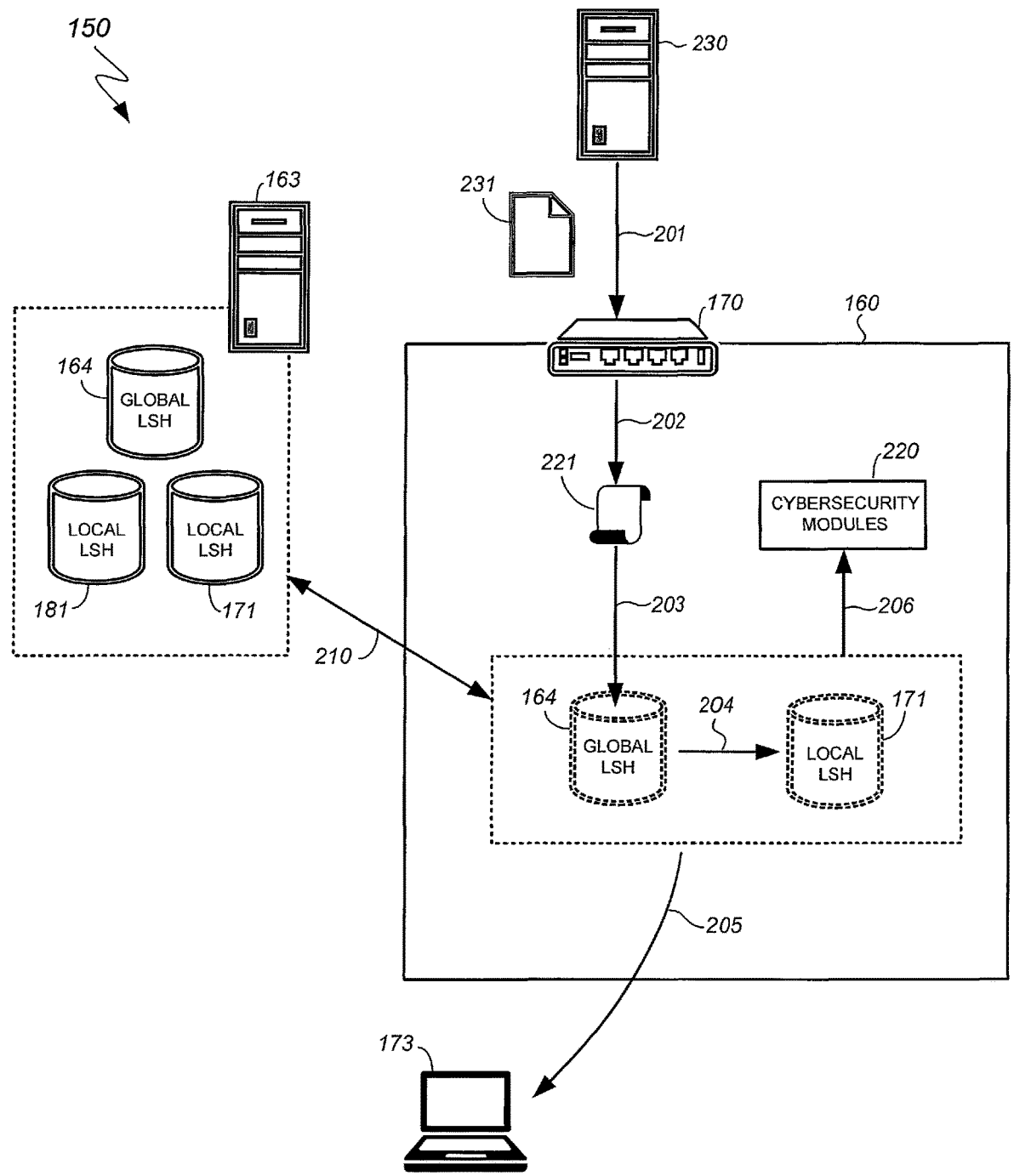
FIG. 2 shows a flow diagram that illustrates evaluation of files for malware or other cybersecurity threats in accordance with an embodiment of the present invention.

FIG. 2 shows a flow diagram that illustrates evaluation of files for malware or other cybersecurity threats in accordance with an embodiment of the present invention. The example of FIG. 2 is explained using the SOC server 163 and components of the private computer network 160. As can be appreciated, the same methodology applies when using components of the private computer network 161. The SOC server 163 and components of the private computer networks 160 and 161 may communicate over the Internet.

The global LSH database 164, local LSH database 171 of the private computer network 160, local LSH database 181 of the private computer network 161, and local LSH databases of other private computer networks may be stored in the infrastructure of the MDR service 162. In the example of FIG. 2, the global LSH database 164, local LSH database 171, and local LSH database 181 are stored on a data storage device of the SOC server 163. In one embodiment, for each private computer network that is subscribed to the outsourced cybersecurity service, the global LSH database 164 and corresponding local LSH database (but not local LSH databases of other private computer networks) are logically mapped for access in the private computer network. In the example of FIG. 2, the global LSH database 164 and the local LSH database 171 (but not the local LSH database 181) are mapped on a logical drive that is accessible by the network security device 170 (see arrow 210).

In the example of FIG. 2, a file 231 is received by the network security device 170 in the private computer network 160 (see arrow 201). The file 231 may have been sent by an unknown server 230 over the Internet. The file 231 may be an email attachment or a file being downloaded by the network device 173, e.g., a laptop computer of a user of the private computer network 160. In one embodiment, the network security device 170 is configured to generate an LSH 221 (see arrow 202) of the file 231 using a locality sensitive hashing function, such as the Trend Micro Locality Sensitive Hash (TLSH) function. Open source program code of the TLSH function is available on the Internet. In this embodiment, the locality sensitive hashes stored in the global LSH database 164, local LSH database 171, local LSH database 181, and other local LSH databases are also generated using the TLSH function.

Generally speaking, a locality sensitive hashing function may extract many very small features (e.g., 3 bytes) of a file and put the features into a histogram, which is encoded to generate a locality sensitive hash. The mathematical distance between locality sensitive hashes of two files may be scored to measure the similarity of the two files. As an example, the distance between locality sensitive hashes of two files may be measured using an approximate Hamming distance algorithm. Generally speaking, the Hamming distance between two locality sensitive hashes of equal length is a measure of the differences between positions of the locality sensitive hashes. The lower the Hamming the distance, the more similar the locality sensitive hashes. Other suitable mathematical distance or approximate distance algorithm may also be employed to measure similarity of two files.

Unlike other types of hashes, such as an SHA-1 hash, small changes to a file will result in different but very similar locality sensitive hashes of the file. Accordingly, malware and mutations of the malware will likely yield different but very similar locality sensitive hashes. Also, a good file and a minor update of the good file will likely yield different but very similar locality sensitive hashes.

Figure 3:
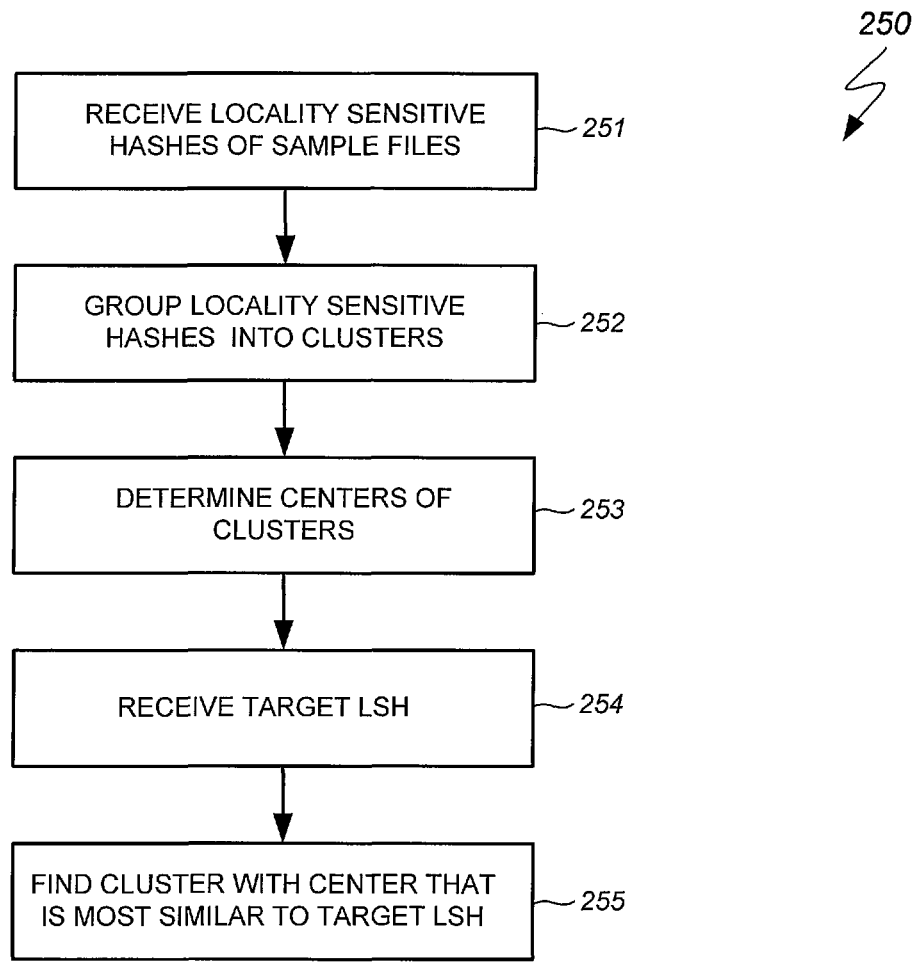
FIG. 3 shows a flow diagram of a method of determining similarity between locality sensitive hashes in accordance with an embodiment of the present invention.

The similarity between locality sensitive hashes may also be determined using a clustering algorithm. FIG. 3. shows a flow diagram of a method 250 of determining similarity between locality sensitive hashes in accordance with an embodiment of the present invention. In the example of FIG. 3, locality sensitive hashes of sample files are received (step 251). The sample files ("samples") may be labeled as "known good", "known bad," or "unknown" for example. The locality sensitive hashes of the samples are grouped into a plurality of clusters, with each cluster comprising locality sensitive hashes that are similar to one another. The locality sensitive hashes may be grouped using a suitable clustering algorithm, such as the K-nearest neighbors (KNN) clustering algorithm, Density-based spatial clustering of applications with noise (DBSCAN) clustering algorithm, ANN clustering algorithm, hierarchical clustering algorithm, etc. The clusters of locality sensitive hashes may serve as entries of a global or local LSH database.

A center is determined for each cluster (step 253). The center of the cluster, which is in the format of a locality sensitive hash, is representative of the locality sensitive hashes of the cluster. The center of the cluster may be described as an average, median, or some other relationship between the members of the cluster, depending on the clustering algorithm employed.

When a target locality sensitive hash is received for similarity determination (step 254), the target locality sensitive hash may be compared to the centers of the clusters to find a cluster with members that are most similar to the target locality sensitive hash (step 255). For example, in the case where the clusters are in an LSH database and the target locality sensitive hash is most similar to a center of a cluster that is labeled as "good", the target locality sensitive hash may be deemed to be similar to a known good locality sensitive hash. Similarly, in the case where the target locality sensitive hash is most similar to a center of a cluster that is labeled as "bad", the target locality sensitive hash may be deemed to be similar to a known bad locality sensitive hash. A cluster may be labeled "good" or "bad" depending on the labels of the members of the cluster, such as based on the ratio of good and bad locality sensitive hashes in the cluster (e.g., a cluster may be labeled bad if at least 90% of the locality sensitive hashes in the cluster are labeled bad).

FIG. 4 shows a data structure 270 of an example cluster in accordance with an embodiment of the present invention. In one embodiment, a cluster includes a header 271 that includes metadata and other information about the cluster. In the example of FIG. 4, the header 271 indicates an identifier of the cluster ("GROUP"), the number of locality sensitive hashes that are members of the cluster ("N ITEMS"), the maximum distance between members of the cluster ("MAX_DIST"), the center of the cluster ("CENTER"), the maximum distance between the center and a member of the cluster ("MAX_DIST_CENTER"), and the label of the cluster ("LABEL"). The header 271 may include other information, such as the name of the malware family to which the members of the cluster belong ("MW_NAME"), if applicable; confidence level of the label assigned to the cluster (e.g., 90% probability of malware or goodware), and other information.

In the example of FIG. 4, the cluster includes a plurality of locality sensitive hashes 272 (i.e., 272-1, 272-2, . . . , 272-n). In the example of FIG. 4, the locality sensitive hash ("TLSH") is generated by applying the TLSH function on the corresponding file. Each locality sensitive hash entry may have a corresponding exact cryptographic hash (e.g., SHA-1) of the file, the label of the file ("LABEL"), the timestamp of when the file was created or first detected ("CREATE TIME"), how many endpoints (i.e., computers) have the file ("CENSUS PREVALENCE"), length of time since creation/detection of the file ("CENSUS MATURITY"; e.g., current time minus CREATE TIME), the digital signature of the company that created the file ("SIGN/COMPANY"), the file path of the file ("FILE PATH"; e.g., C:\Program Files (x86)\Google\Chrome\Application\chrome.exe), the locality sensitive hash of the file path ("FILE PATH TLSH"), and an indicator of a suspicious behavior of the file during execution ("BEHAVIOR TAG"; e.g., network connections, creates then deletes multiple files, deletes shadow copy, directory discovery, etc.). As can be appreciated, some information noted above may not be applicable or available for a particular file. In that case, the corresponding field in the data structure will be empty.

In the examples of the present disclosure, the locality sensitive hashing function is applied on the binary of the file itself. As can be appreciated, the locality sensitive hashing function may also be applied on contextual or behavioral information of the file for comparison with locality sensitive hashes of contextual or behavioral information of other files. Also, the locality sensitive hashing function, such as the TLSH function used in the examples, are man-made. As can be appreciated, locality hashing functions that are defined by expert systems or neural networks, such as a so-called "autoencoder" or "2vec", may also be employed without detracting from the merits of the present invention.

Continuing the example of FIG. 2, the network security device 170 uses the LSH 221 to query the global LSH database 164 for global file information of the file 231 (see arrow 203). In one embodiment, the network security device 170 is configured to search the global LSH database 164 for a locality sensitive hash that is similar to the LSH 221 relative to other locality sensitive hashes that are stored in the global LSH database 164. For example, the network security device 170 may be configured to find, in the global LSH database 164, a locality sensitive hash that is within a predetermined threshold distance to the LSH 221. The predetermined threshold distance may be set based on false positive/false negative requirements. Locality sensitive hashes that are within (i.e., including exact match) the predetermined threshold distance may be deemed to be similar to the LSH 221.

The network security device 170 may act on the file 231 depending on global file information of the file 231. The network security device 170 may allow the file 231 to pass when the LSH 221 is similar to a known good locality sensitive hash in the global LSH database 164. For example, when the intended destination of the file 231 is the network device 173, the network security device 170 may allow the file 231 to be received by the network device 173 (see arrow 205) when the LSH 221 is similar to a known good locality sensitive hash stored in the global LSH database 164.

Conversely, the network security device 170 may block the file 231 when the LSH 221 is similar to a known bad locality sensitive hash in the global LSH database 164. Generally speaking, a file may be blocked by blocking network traffic that includes the file, putting the file in quarantine, deleting the file, or otherwise preventing the file from being executed.

It is possible that there is no global file information about a file. This is the case when there is no locality sensitive hash in the global LSH database 164 that is within the predetermined threshold distance to the locality sensitive hash of the file, i.e., there is no similar locality sensitive hash in the global LSH database 164.

In one embodiment, when there is no global information about the file 231, the network security device 170 is configured to query the local LSH database 171 for local file information about the file 231 (see arrow 204). More particularly, the network security device 170 may search the local LSH database 171 for a known good locality sensitive hash that is similar, i.e., within the predetermined threshold distance, to the LSH 221. The network security device 170 may be configured to allow the file 231 to pass when the LSH 221 is similar to a known good locality sensitive hash stored in the local LSH database 171.

Otherwise, when the LSH 221 is not similar to any known good locality sensitive hash stored in the local LSH database 171, the network security device 170 deems the file 231 to be suspicious and accordingly marks the file 231 for further evaluation, such as by providing the file 231 to one or more cybersecurity modules 220 (see arrow 206). The cybersecurity modules 220 may include an antivirus module, sandbox, indicator of compromise detector, indicator of attack detector, and/or other conventional modules for evaluating a file for malware or other cybersecurity threats. The network security device 170 may allow the file 231 to pass when the cybersecurity modules 220 indicate that the file 231 does not pose a cybersecurity threat, e.g., when the file 231 is not malware. Conversely, the network security device 170 may block the file 231 when the cybersecurity modules 220 indicate that the file 231 poses a cybersecurity threat, e.g., the file 231 is malware.

Figure 5:
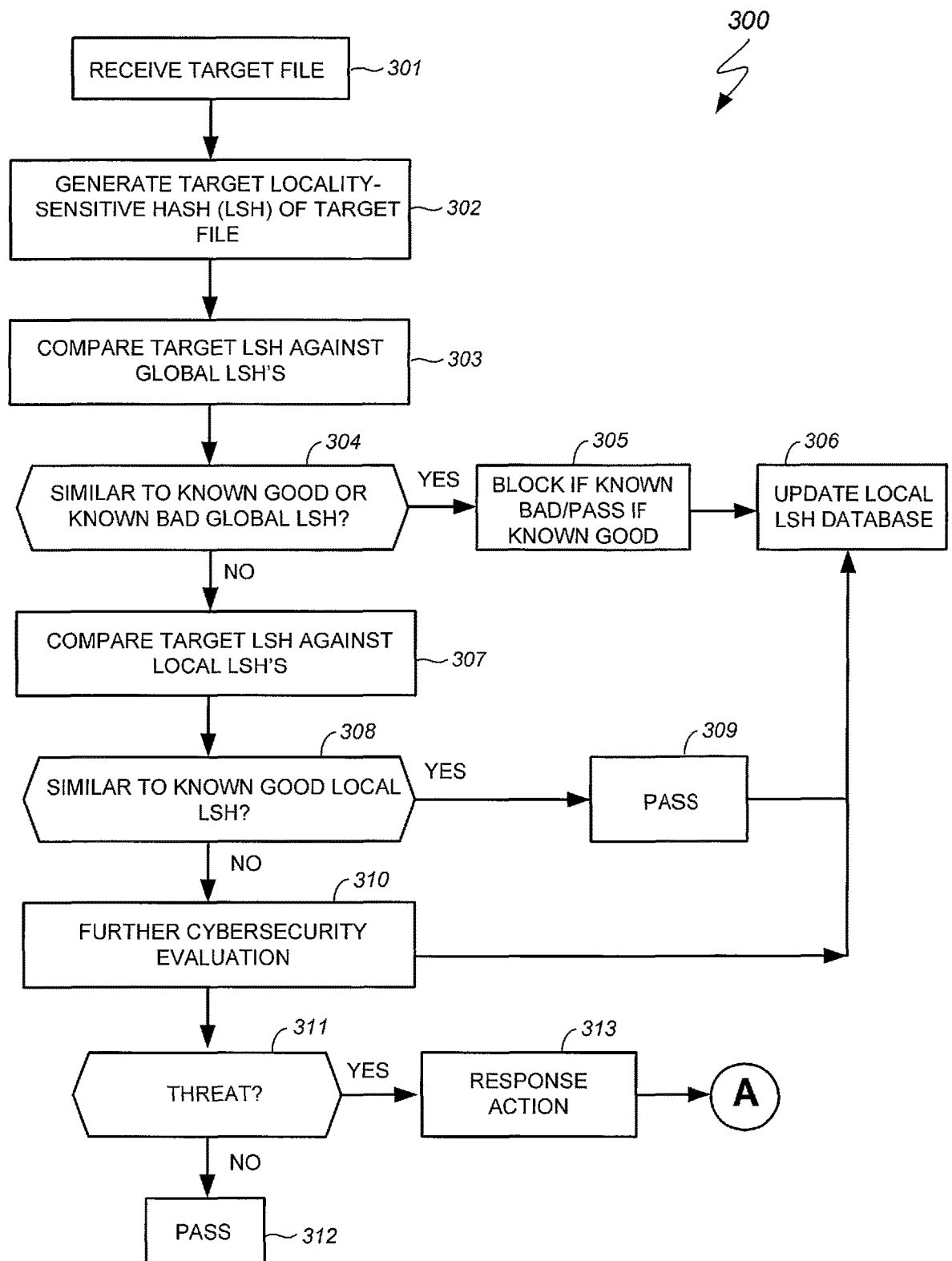
FIGS. 5 and 6 show a flow diagram of a method of evaluating files for malware or other cybersecurity threats in accordance with an embodiment of the present invention.
Figure 6:
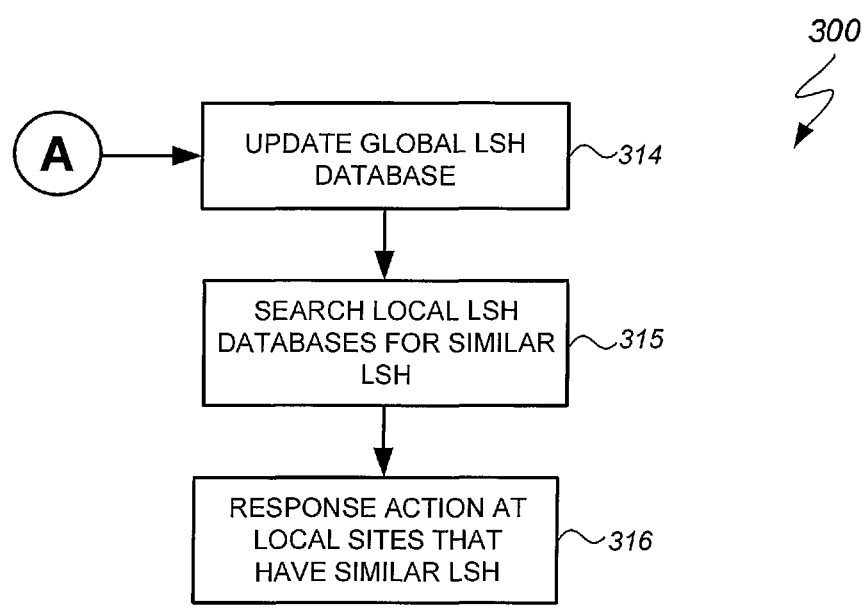

FIGS. 5 and 6 show a flow diagram of a method 300 of evaluating files for malware or other cybersecurity threats in accordance with an embodiment of the present invention. The method 300 may be performed by a network security device in conjunction with an SOC server of an MDR service. As can be appreciated, the method 300 may be performed by other components without detracting from the merits of the present invention.

Beginning with FIG. 5, a target file, i.e., a file to be evaluated for malware, is received in a private computer network (FIG. 5, step 301). The target file may be received by a network security device in the private computer network. The network security device generates a target locality sensitive hash by applying a locality sensitive hashing function (e.g., TLSH function) on the target file (FIG. 5, step 302). The network security device compares the target locality sensitive hash against global locality sensitive hashes, i.e., locality sensitive hashes stored in a global LSH database (FIG. 5, step 303).

As previously noted, the center of a cluster is in the format of a locality sensitive hash and is representative of the locality sensitive hashes of the cluster. Accordingly, in the present disclosure, determining similarity of the target locality sensitive hash to locality sensitive hashes stored in a global or local LSH database includes comparing the target locality sensitive hash to individual locality sensitive hashes or, in the case where the locality sensitive hashes are in clusters in the global or local LSH database, to centers of the clusters.

The network security device allows the target file to pass when the target locality sensitive hash is similar to a known good global locality sensitive hash, and blocks the target file when the target locality sensitive hash is similar to a known bad global locality sensitive hash (FIG. 5, step 304 to 305). In that case, the network security device updates its corresponding local LSH database with file information of the target file (FIG. 5, step 305 to step 306), which may be helpful in subsequent correlation/investigation activities. The update may fill-in missing information or update old information in the local LSH database.

When the target locality sensitive hash is not similar to any global locality sensitive hash stored in the global LSH database, the network security device compares the target LSH against local locality sensitive hashes, i.e., locality sensitive hashes stored in a corresponding local LSH database (FIG. 5, step 304 to step 307). The network security device allows the target file to pass when the target locality sensitive hash is similar to a known good local locality sensitive hash (FIG. 5, step 308 to step 309). In that case, the network security device updates the local LSH database with file information of the target file (FIG. 5, step 309 to step 306).

Otherwise, when the target locality sensitive hash is not similar to a known good local locality sensitive hash, the network security device marks the target file for further malware or other cybersecurity evaluation (FIG. 5, step 308 to step 310). For example, the target file itself may be scanned for malware signatures using an antivirus module, executed in a sandbox to detect malware behavior, inspected for indicators of compromise, inspected for indicators of attack, etc.

The network security device may allow the target file to pass when the result of the further evaluation indicates that the target file does not pose a cybersecurity threat, e.g., not malware (FIG. 5, step 311 to step 312). The network security device may perform a response action against the target file when the further evaluation of the target file indicates that the target file poses a cybersecurity threat, e.g., the target file is malware (FIG. 5, step 311 to step 313). The response action may include blocking the target file in the private computer network protected by the network security device.

The global LSH database may be updated when the target file is detected to pose a cybersecurity threat (FIG. 5, step 313 to FIG. 6, step 314). For example, the network security device may so inform the SOC server of the MDR service. The global LSH database may be updated to label the target locality sensitive hash as bad and to include newly discovered information about the target file. Updating the global LSH database not only blocks the target file at the private computer network, but also at other private computer networks that subscribe to the MDR service but have yet to receive the target file.

In response to detecting that the target LSH is bad, local LSH databases may be searched for similar local locality sensitive hashes (FIG. 6, step 315). This allows an otherwise undetected target file or variation of the target file to be detected. Response actions may be performed against the target file or variations of the target file at the private computer networks where they are found (FIG. 6, step 316).

Figure 7:
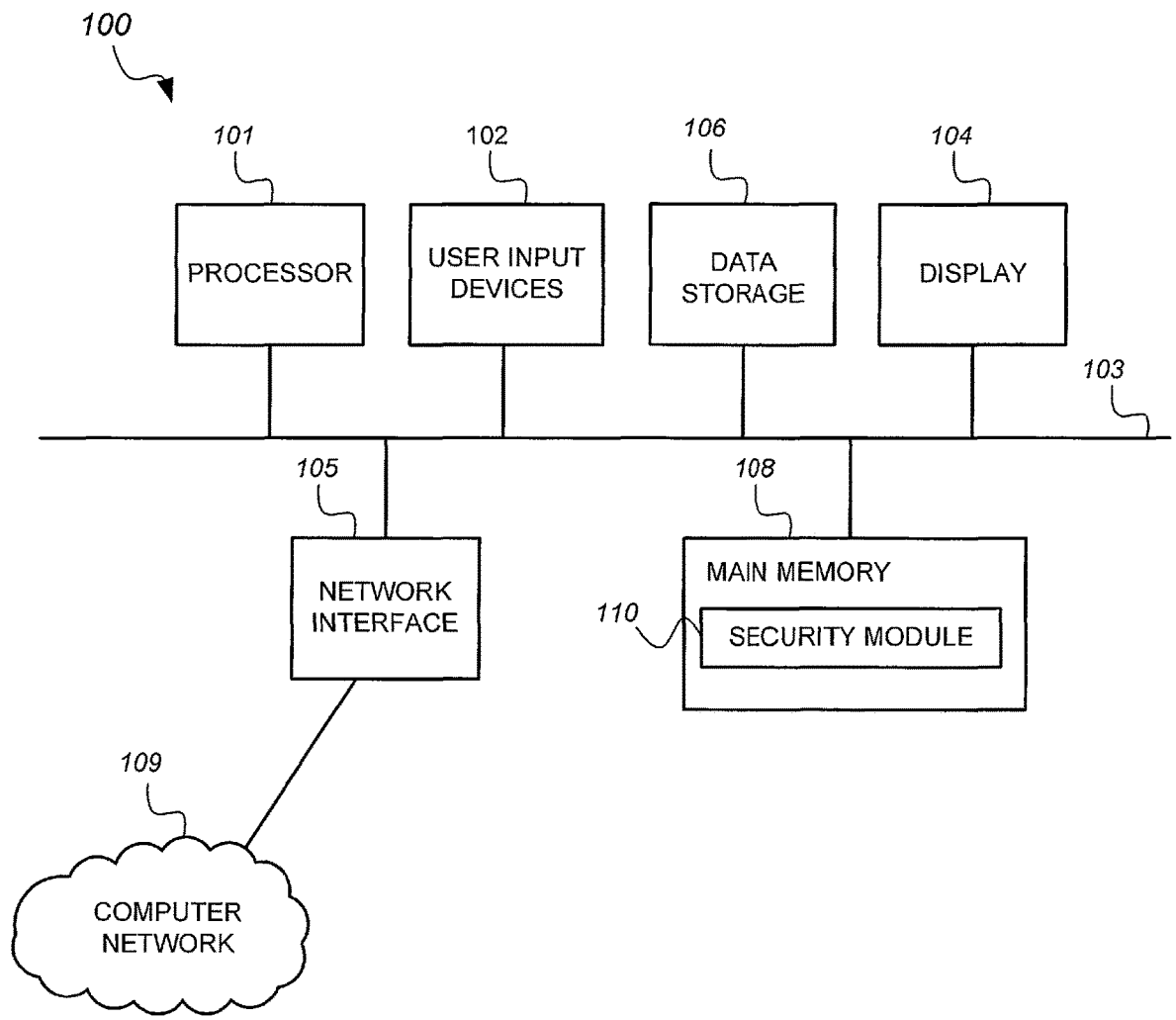
FIG. 7 shows a logical diagram of a computer system that may be employed with embodiments of the present invention.

Referring now to FIG. 7, there is shown a logical diagram of a computer system 100 that may be employed with embodiments of the present invention. The computer system 100 may be employed as a network security device or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more security modules 110, comprising instructions stored non-transitory on the main memory 108 for execution by the processor 101 to cause the computer system 100 to perform corresponding programmed steps to evaluate files for malware or other cybersecurity threats as disclosed herein. An article of manufacture may be embodied as computer-readable storage medium including instructions that when executed by the processor 101 cause the computer system 100 to be operable to perform the functions of the one or more security modules 110.

Systems and methods for evaluating files for malware or other cybersecurity threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of evaluating files for cybersecurity threats, the method comprising:
    generating a target locality sensitive hash of a target file of a private computer network;
    comparing the target locality sensitive hash to global locality sensitive hashes of a first database, the global locality sensitive hashes comprising locality sensitive hashes of files of a plurality of different private computer networks that includes the private computer network;
    in response to detecting that the target locality sensitive hash is not similar to any of the global locality sensitive hashes, comparing the target locality sensitive hash to local locality sensitive hashes of a second database that is separate from the first database, the local locality sensitive hashes comprising locality sensitive hashes of files of the private computer network;
    in response to detecting that the target locality sensitive hash is not similar to any of the local locality sensitive hashes that is known good, further evaluating the target file for cybersecurity threats; and
    in response to the further evaluation of the target file indicating that the target file is malware, performing a response action against the target file, wherein the response action includes blocking the target file;
    wherein detecting that the target locality sensitive hash is not similar to any of the global locality sensitive hashes includes detecting that a mathematical distance between the target locality sensitive hash and any of the global locality sensitive hashes is not within a predetermined threshold distance.

2. The method of claim 1, wherein further evaluating the target file includes scanning the target file for malware signatures.

3. The method of claim 1, wherein further evaluating the target file includes executing the target file in a sandbox.

4. The method of claim 1, further comprising:
    in response to the further evaluation of the target file indicating that the target file is not malware, allowing the target file to pass.

5. The method of claim 1, further comprising:
    in response to the further evaluation of the target file indicating that the target file is malware, searching local locality sensitive hashes of other private computer networks of the plurality of private computer networks for a local locality sensitive hash that is similar to the target locality sensitive hash.

6. A computer system comprising at least one processor and a memory, the memory storing instructions that when executed by the at least one processor cause the computer system to:
    receive a target file in a private computer network;
    generate a target locality sensitive hash of the target file;
    determine a mathematical distance between the target locality sensitive hash and each of a plurality of global locality sensitive hashes of a first database, the plurality of global locality sensitive hashes comprising locality sensitive hashes of files of a plurality of different private computer networks that includes the private computer network;
    in response to detecting that the target locality sensitive hash is not within a predetermined threshold distance to any of the plurality of global locality sensitive hashes, determine a mathematical distance between the target locality sensitive hash and each of a plurality of local locality sensitive hashes of a second database, the plurality of local locality sensitive hashes comprising locality sensitive hashes of files of the private computer network, the second database being separate from the first database;
    in response to detecting that the target locality sensitive hash is not within a predetermined threshold distance to any of the plurality of local locality sensitive hashes, mark the target file for further evaluation; and
    in response to the further evaluation of the target file indicating that the target file is malware, perform a response action against the target file, wherein the response action includes blocking the target file.

7. The computer system of claim 6, wherein the plurality of global locality sensitive hashes and the plurality of local locality sensitive hashes are stored in data storage devices of another computer system.

8. The computer system of claim 7, wherein the plurality of global locality sensitive hashes and the plurality of local locality sensitive hashes are logically mapped to the computer system.

9. The computer system of claim 6, wherein the target file is further evaluated by scanning the target file for malware signatures.

10. The computer system of claim 6, wherein the target file is further evaluated by executing the target file in a sandbox.

11. The computer system of claim 6, wherein the instructions stored in the memory, when executed by the at least one processor further cause the computer system to:
    in response to the further evaluation of the target file indicating that the target file is malware, search local locality sensitive hashes of other private computer networks of the plurality of private computer networks for a local locality sensitive hash that is within a predetermined threshold distance to the target locality sensitive hash.

12. A computer-implemented method of evaluating files for cybersecurity threats, the method comprising:
    generating a target locality sensitive hash of a target file of a private computer network;
    searching a global locality sensitive hash (LSH) database for a cluster of global locality sensitive hashes that are similar to the target locality sensitive hash, the global LSH database comprising locality sensitive hashes of files of a plurality of different private computer networks that includes the private computer network;
    in response to detecting that the global LSH database does not have a cluster of global locality sensitive hashes that are similar to the target locality sensitive hash, searching a local LSH database for a cluster of local locality sensitive hashes that are similar to the target locality sensitive hash, the local LSH database comprising locality sensitive hashes of files of the private computer network, wherein the global LSH database and the local LSH database are separate databases;

in response to detecting that the local LSH database does not have a cluster of local locality sensitive hashes that are similar to the target locality sensitive hash, marking the target file for further evaluation for cybersecurity threats; and in response to the further evaluation of the target file for cybersecurity threats indicating that the target file is malware, blocking the target file;

wherein detecting that the global LSH database does not have a cluster of global locality sensitive hashes that are similar to the target locality sensitive hash includes detecting that a mathematical distance between the target locality sensitive hash and a center of any of a plurality of clusters of global locality sensitive hashes in the global LSH database is not within a predetermined threshold distance.

13. The method of claim 12, wherein the further evaluation of the target file for cybersecurity threats includes scanning the target file for malware signatures.

14. The method of claim 12, further comprising:
in response to the further evaluation of the target file for cybersecurity threats indicating that the target file is malware, searching local LSH databases of other private computer networks for other clusters of local locality sensitive hashes that are similar to the target locality sensitive hash.

* * * * *